(No Model.)
E. C. MORRIS.
COMBINED COATING AND COVERING FOR SIDES OF ROOMS, &c.
No. 331,152. Patented Nov. 24, 1885.
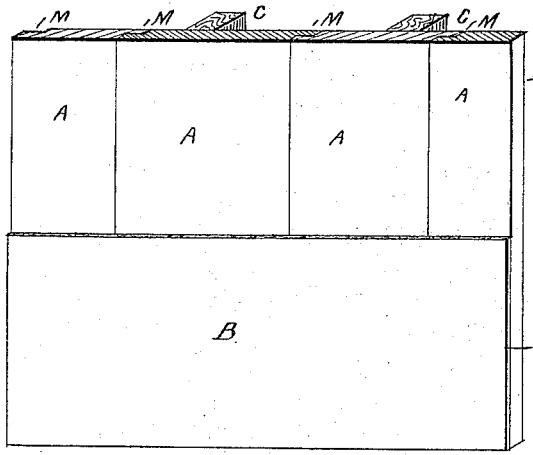
*Fig. 1.*
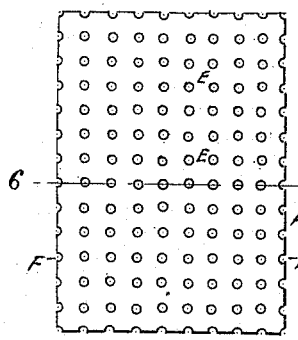
*Fig. 3.*
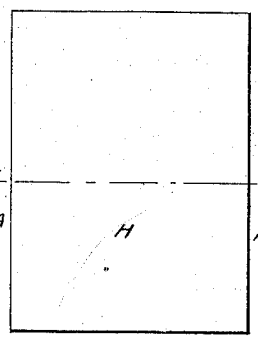
*Fig. 2.*
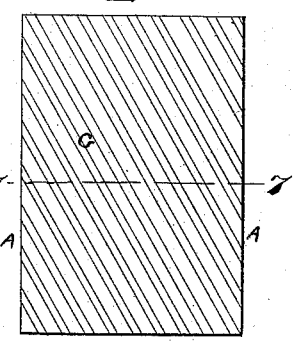
*Fig. 4.*
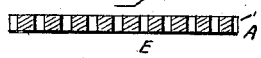
*Fig. 6.*
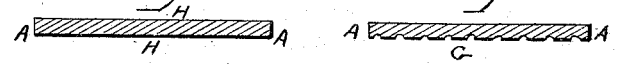
*Fig. 5.*     *Fig. 7.*
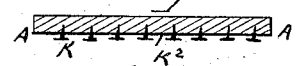
*Fig. 8.*
*Fig. 9.*
Witnesses
N. E. Bellows.
Wm. S. Bellows
Edw. C. Morris.
Inventor
by Brown Brothers
Attorneys

UNITED STATES PATENT OFFICE.

EDWARD C. MORRIS, OF BOSTON, MASSACHUSETTS.

COMBINED COATING AND COVERING FOR SIDES OF ROOMS, &c.

SPECIFICATION forming part of Letters Patent No. 331,152, dated November 24, 1885.

Application filed June 15, 1885. Serial No. 168,751. (No model.)

*To all whom it may concern:*

Be it known that I, EDWARD C. MORRIS, of Boston, in the county of Suffolk and State of Massachusetts, have invented certain new and useful Improvements in a Combined Coating or Covering for the Sides of Rooms or other Inclosures, of which the following is a full, clear, and exact description.

The object of this invention is to produce a coating or covering for the sides of rooms or other inclosures of houses and buildings of all kinds, and other structures to which it may be found applicable, which can be most readily and practically rendered water and moisture proof, and also fire-proof, and which is capable of most ready application and of great durability and useful service therefor.

To this end the present invention consists of a coating or covering for the purpose stated which is in separate layers or thicknesses—to wit, one or more layers each composed of fibrous material or materials capable of being reduced to a pulp, and therefrom made into a sheet or other suitable form, and either in the condition of pulp or after being made into a sheet or other form, as stated, and rendered either water and moisture proof or fire-proof, or both water and moisture and fire proof, in or by any of the ordinary or other suitable ways or means, and one or more layers of any suitable plastic material, or composition of plastic materials—such as lime, water, and sand—of which "ordinary plastering," as it is termed, for rooms is now made, or any other suitable material, or composition of materials capable of being made plastic, and, after being applied, drying and hardening, and such as when dry will be water and moisture proof, and also fire-proof, a composition most suitable therefor being made of asbestine, silicate of soda, potash, and water, as and in the manner fully described in the specification of Letters Patent of the United States issued to H. W. Merritt, dated July 14, 1885, No. 332,307, and which several layers, the one inside of the other, with the plastic layer on the outside, are constructed, arranged, and combined together, all substantially as hereinafter fully described.

In the accompanying plate of drawings, forming a part of this specification, and to which reference is hereby had for a better understanding of the invention herein described, Figure 1 is a perspective view, on a reduced scale, more particularly as to length and width, in illustration of the present improved combined coating or covering for sides of rooms or other inclosures, &c., in its separate and combined layers. Figs. 2, 3, and 4 are face views, also on a reduced scale, of one of the layers of the improved combined coating or covering—to wit, a layer of the pulped and sheet-formed fibrous material detached, and in various styles of constructions, as will hereinafter fully appear. Figs. 5, 6, and 7 are cross-sections on lines 5 5, 6 6, and 7 7 of Figs. 2, 3, and 4, respectively. Figs. 8 and 9 are cross-sections similar to Figs. 5, 6, and 7, showing other styles of constructions of the layer or sheet-formed fibrous material, as will hereinafter appear.

In the drawings, A and B represent together the coating or covering, composed of a layer of fibrous material pulped and made into a sheet form, (marked A,) and of a layer of plastic material or materials—such as a composition, which is most preferable, of asbestine, silicate of soda, potash, and water, and hereinbefore referred to—(marked B,) but which, however, may be a plastic composition of other kinds and character—as, for instance, a composition of lime, water, and sand, such as ordinary plastering for rooms and other inclosures is made of, as well known—made water and fire proof.

The layer A, of fibrous sheet material in separate sheets placed alongside of each other, is attached, by nails or by any other suitable fastenings or means, to the studding illustrated at C, or other structure making the side of the room or other inclosure which is to be coated and covered, and then over this layer A, so made up, the layer of plastering B is applied, coating and covering the outer surface of the layer A evenly at all points and parts, and thus completing in one form the combined coating or covering of the sides of rooms or other inclosures of this invention.

The layers A and B may be repeated in as many separate layers as may be desired; but one layer of each, however, is all sufficient. Again, the layer A is made water and moisture proof, and also fire-proof, in any of the ordinary or other suitable ways, and the layer B also similarly so made, and either by using materials to constitute the plastering having such qualities, either alone or as combined, or by a suitable treatment of the materials which are used to constitute the plastering, to render the plastering so proof against water and moisture and fire. The fibrous layer A may be made water and moisture and fire proof either when the fibers making the layer are in a state of pulp or after they are reduced to the form of sheets or other suitable form for use for the purposes of this invention, and in a manner substantially as stated; and, again, the layer A may, if so desired, be perforated, as at E, and have its edge or edges corrugated, as at F, Figs. 3 and 6, or corrugated on one and its outer surface, as at G, Figs. 4 and 7, or smooth on both surfaces, as at H, Figs. 2 and 5, or have headed projections, as at J, Fig. 8, or studs or protuberances, as at K, Fig. 9, on its outer and plastering-receiving face, K², or in other ways formed as may be thought desirable to increase the strength and reliability of union of the layer of plastic material B to the layer of fibrous material A, or to secure an interlock, as it were, between the two layers; but while such formation of the layer A may, in the use of some plastic compositions—such as ordinary lime-plasterings—be most desirable and serviceable and more or less necessary or requisite, still it is not intended to limit this invention in that regard, for with other plastic compositions—such as that herein described as being composed in part of asbestine—it is neither necessary nor requisite in order to secure the proper union between the separate layers A B of the combined coating and covering of this invention.

The waterproofing of the fibrous and plastic layers prevents shrinkage of either and warping of the fibrous layers, which is still further insured by perforations of said fibrous layers, but which is not essential.

The separate sheets making up the layers A may be placed edge to edge, or edge overlapping edge, as shown at M, with a scarf-joint of any suitable form, and either that particularly shown or any other of the well-known forms.

For obvious reasons it is most preferable that the combined coating or covering herein described be made both water and moisture and fire proof in both of its layers A and B; but in any event the fibrous and plastic layers are to be made water-proof.

Having thus described my invention, I claim—

An improved coating or covering for the sides of rooms or other inclosures and places, composed of separate layers made, the one of fibrous material or materials pulped and made water-proof into a sheet or other suitable form, and the other of a material or materials of a plastic nature or water-proof character, substantially as described.

In testimony whereof I have hereunto set my hand in the presence of two subscribing witnesses.

EDWARD C. MORRIS.

Witnesses:
 ALBERT W. BROWN,
 WM. S. BELLOWS.